(12) United States Patent
Zomer et al.

(10) Patent No.: US 11,362,483 B2
(45) Date of Patent: Jun. 14, 2022

(54) SYSTEM AND METHOD FOR GENERATING A SPATIALLY LOCALISED HIGH-INTENSITY LASER BEAM

(71) Applicants: AMPLITUDE SYSTEMES, Pessac (FR); CENTRE NATIONAL DE LA RECHERCHE SCIENTIFIQUE, Paris (FR)

(72) Inventors: Fabien Zomer, Limours (FR); Pierre Favier, Palaiseau (FR); Antoine Courjaud, Leognan (FR)

(73) Assignees: AMPLITUDE, Pessac (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 232 days.

(21) Appl. No.: 16/765,740

(22) PCT Filed: Nov. 20, 2018

(86) PCT No.: PCT/FR2018/052924
§ 371 (c)(1),
(2) Date: May 20, 2020

(87) PCT Pub. No.: WO2019/097197
PCT Pub. Date: May 23, 2019

(65) Prior Publication Data
US 2020/0295527 A1    Sep. 17, 2020

(30) Foreign Application Priority Data
Nov. 20, 2017   (FR) ...................................... 1760938

(51) Int. Cl.
*G01J 3/44*         (2006.01)
*H01S 3/30*        (2006.01)
(Continued)

(52) U.S. Cl.
CPC ............... *H01S 3/30* (2013.01); *G01J 3/44* (2013.01); *H01S 3/08059* (2013.01); *H01S 3/1003* (2013.01); *H01S 3/1305* (2013.01)

(58) Field of Classification Search
CPC ...... H01S 3/30; H01S 3/08059; H01S 3/1003; H01S 3/1305; H01S 3/0071;
(Continued)

(56) References Cited

U.S. PATENT DOCUMENTS

2005/0254534 A1* 11/2005 Loewen .................. G21K 1/02
372/18
2007/0086713 A1    4/2007 Ingmar et al.

FOREIGN PATENT DOCUMENTS

WO    WO 2006/130856    12/2006

OTHER PUBLICATIONS

International Search Report, PCT/FR2018/052924, dated Mar. 13, 2019.
Writtten Opinion, PCT/FR2018,052924, dated Mar. 13, 2019.

* cited by examiner

*Primary Examiner* — Abdullahi Nur
(74) *Attorney, Agent, or Firm* — Nixon & Vanderhye

(57) ABSTRACT

Disclosed is a system for generating a spatially localized, high-intensity laser beam, including: a laser source designed to generate a burst of N laser pulses with a duration of less than or equal to one picosecond, the N laser pulses having a first repetition frequency greater than or equal to 0.5 gigahertz; a resonant optical cavity designed to receive and store the burst of N laser pulses, the resonant optical cavity being designed to focus the burst of N laser pulses in an interaction region of the resonant optical cavity; and a servo control system designed to control the first repetition frequency relative to the roundtrip distance in the resonant optical cavity, such that the N pulses of the burst are
(Continued)

Figure 1:
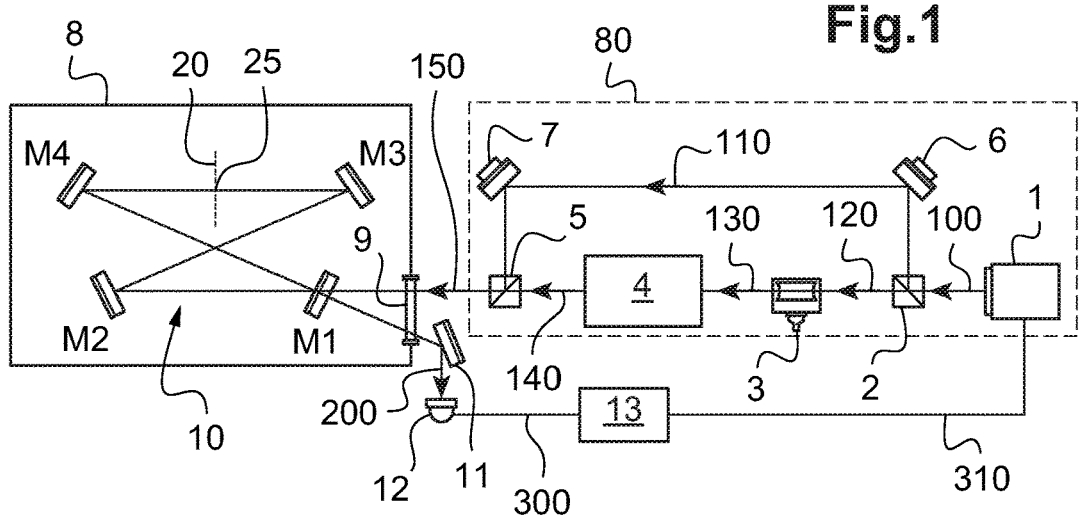

superimposed temporally and spatially by constructive interferences in the interaction region so as to form one giant ultra-short and high-energy pulse.

20 Claims, 3 Drawing Sheets

(51) Int. Cl.
    *H01S 3/08*         (2006.01)
    *H01S 3/10*         (2006.01)
    *H01S 3/13*         (2006.01)

(58) Field of Classification Search
    CPC ...... H01S 3/0085; H01S 3/005; H01S 3/1303; G01J 3/44; G01J 3/02; H05G 2/00; H05G 2/008
    See application file for complete search history.

SYSTEM AND METHOD FOR GENERATING A SPATIALLY LOCALISED HIGH-INTENSITY LASER BEAM

TECHNICAL FIELD TO WHICH THE INVENTION RELATES

The present invention generally relates to the fields of lasers.

More particularly, it relates to a laser system generating a very high-intensity laser beam localised at a point in space.

It also relates to a very high-intensity laser system intended to interact at a localised point by inelastic scattering with a charged particle beam or with a sample to be analysed.

It relates in particular to a method and a device for measurement of an inverse Compton scattering generated by interaction between a laser beam and a charged particle beam.

TECHNOLOGICAL BACK-GROUND

The particle accelerators are great scientific instruments used in particular in fundamental physics. It is searched to develop new applications for these particle beams in the field of scientific instruments or medical devices. These applications require the development of an intense and compact X-ray source for use, for example, in a medical or art history environment.

In particular, it is searched to generate an inverse Compton scattering radiation based on the Compton interaction between a packet of electrons and a laser beam. Now, the intensity of the radiation generated by inelastic scattering depends both on the number of photons and on the number of electrons at the time of interaction. Moreover, the intensity of the inverse Compton scattering radiation is not isotropically distributed. Indeed, the intensity of the inverse Compton scattering radiation highly depends on the angle between the electron beam and the laser beam and/or on the angle between the incident laser beam and the scattered beam. It is hence searched to maximize the intensity of the detected inverse Compton scattering radiation.

Different types of accelerators, of the linear or the ring type, are contemplated to produce packets of low-energy electrons (of the order of 50 MeV). A storage ring has an advantageous configuration due to its compactness, low cost and ease of use. The compactness and low energy impose challenges in the choice of particle accelerators as well as in the coupling configuration between the particle beam and a laser beam.

An ELI-NP-GS source is known, which uses an optical recirculator comprising two parabolic mirrors and 31 pairs of helically-arranged mirrors so as to circulate 32 times a same 200-mJ laser pulse. Hence, this same 200-mJ laser pulse interacts successively at a same focal point with 32 packets of electrons generated at a rate of 100 hertz (Hz). However, this type of optical recirculator is bulky. Moreover, the setting of the 64 mirrors in a vacuum chamber is particularly complex.

There also exist systems coupling a laser beam to a Fabry-Perot cavity to amplify a steady-state laser beam.

Generally, it is desirable to have a high-intensity laser system, localised at a determined point.

More particularly, it is searched to develop a system for the interaction between a charged particle beam and a high-intensity laser beam, which is easy to implement and which allows increasing the intensity of an inelastic scattering beam by an inverse Compton effect generated by this interaction.

OBJECT OF THE INVENTION

In order to remedy the above-mentioned drawbacks of the state of the art, the present invention proposes a system for generating a spatially localised high-intensity laser beam.

More particularly, it is proposed according to the invention a system comprising a laser source adapted to generate a burst of N laser pulses, where N is a natural integer higher than 1, the N laser pulses having a first repetition frequency ($f_1$), the laser pulses being ultra-short laser pulses having a duration lower than or equal to 1 picosecond and the first repetition frequency ($f_1$) being higher than or equal to 0.5 gigahertz, a resonant optical cavity adapted to receive and store said burst of N laser pulses, the resonant optical cavity being adapted to focus the burst of N laser pulses to an interaction area of the resonant optical cavity, a round-trip distance in the resonant optical cavity being equal to $c/f_1$, where c is the speed of light, and a servo control system adapted to control the first repetition frequency ($f_1$) with respect to the round-trip distance in the resonant optical cavity so that the N pulses of the burst are temporally and spatially superimposed to each other by constructive interferences in the interaction area to form an ultra-short and high-energy giant pulse.

This system allows generating a determined interaction area, a laser beam having an extremely high intensity, this laser pulse being of ultra-short duration and having a power multiplied by about a factor N by the resonant optical cavity.

Preferably, N is a natural integer comprised between 10 and 1000, and more preferably, comprised between 100 and 300.

In a particular embodiment, the laser source comprises an oscillator emitting at the first repetition frequency ($f_1$).

In another particular embodiment, the laser source comprises a regenerative amplifier, preferably of the fibre-optic type, wherein the optical amplifier comprises a primary optical cavity, and the servo control system is adapted to adjust the length of the primary optical cavity so as to control the first repetition frequency ($f_1$).

Preferably, the first repetition frequency ($f_1$) is higher than or equal to 1 GHz.

Advantageously, the laser source comprises a pulse picker adapted to select the burst of N ultra-short laser pulses with a second repetition frequency ($f_2$) lower than or equal to 4 MHz.

Preferably, the resonant optical cavity comprises mirrors arranged in a planar configuration.

According to a particular and advantageous embodiment, the resonant optical cavity comprises two spherical mirrors and two planar mirrors, the two spherical mirrors and two planar mirrors being arranged in a planar configuration.

According to a variant, the resonant optical cavity comprises two spherical mirrors and only one planar mirror.

Advantageously, the resonant optical cavity comprises a first concave spherical mirror (M3), of radius of curvature R/2, a second concave spherical mirror (M4), of radius of curvature R/2, the first concave spherical mirror (M3) and the second concave spherical mirror (M4) being arranged in a concentric configuration, the distance between the first concave spherical mirror (M3) and the second concave spherical mirror (M4) being equal to R.

According to a particular aspect, the servo control system comprises a detector adapted to detect a signal representative of the constructive interferences of the N pulses of the burst in the resonant optical cavity.

According to an embodiment, the resonant optical cavity is arranged in a vacuum chamber comprising at least one opening adapted to receive the burst of N ultra-short laser pulses, said at least one opening being adapted to receive a charged particle beam, the resonant optical cavity being arranged so that the charged particle beam propagates in the interaction area under an incidence angle lower than or equal to 5 degrees with respect to a direction of propagation of the burst of laser pulses in the interaction area.

Particularly advantageously, the resonant optical cavity has a volume lower than a few $dm^3$ and preferably lower than 1 $dm^3$.

The invention also proposes a Raman spectrometry device comprising a system for generating a spatially localised high-intensity laser beam in which the interaction area is intended to receive a sample to be analysed, the Raman spectrometry device comprising a Raman spectrometer arranged so as to measure a Raman scattering optical beam formed by scattering of said ultra-short giant pulse on the sample of the interaction area.

The invention also proposes a method for generating a spatially localised high-intensity laser beam, comprising the following steps:

generating laser pulses having a duration lower than or equal to 1 picosecond at a first repetition frequency ($f_1$), the first repetition frequency being higher than or equal to 0.5 gigahertz;

selecting a burst of N laser pulses at the first repetition frequency ($f_1$), where N is a natural integer higher than or equal to 1;

injecting the burst of N laser pulses into a resonant optical cavity, the resonant optical cavity having a roundtrip distance equal to $c/f_1$, where c is the speed of light in the resonant optical cavity, the resonant optical cavity being adapted to focus the burst of N laser pulses to an interaction area of the resonant optical cavity; and controlling the first repetition frequency ($f_1$) with respect to the roundtrip distance of the resonant optical cavity so that the N pulses of the burst are temporally and spatially superimposed to each other by constructive interferences in the interaction area to form an ultra-short and high-energy giant pulse.

The invention also proposes a method for measuring inelastic scattering by interaction of the ultra-short giant pulse generated according to the claimed method with a charged particle beam propagating in the interaction area of the resonant optical cavity in synchronism with the ultra-short giant pulse.

Finally, the invention proposes a method for measuring inelastic scattering by interaction of the ultra-short giant pulse generated according to the claimed method with a sample placed in the interaction area of the resonant optical cavity.

DETAILED DESCRIPTION OF AN EXEMPLARY EMBODIMENT

The following description in relation with the appended drawings, given by way of non-limitative examples, will allow a good understanding of what the invention consists of and of how it can be implemented.

Figure 2:
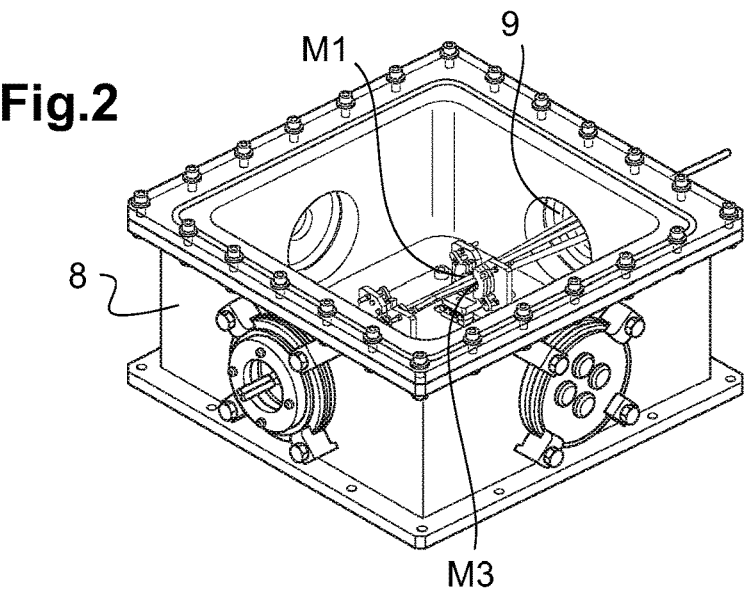
Figure 3:
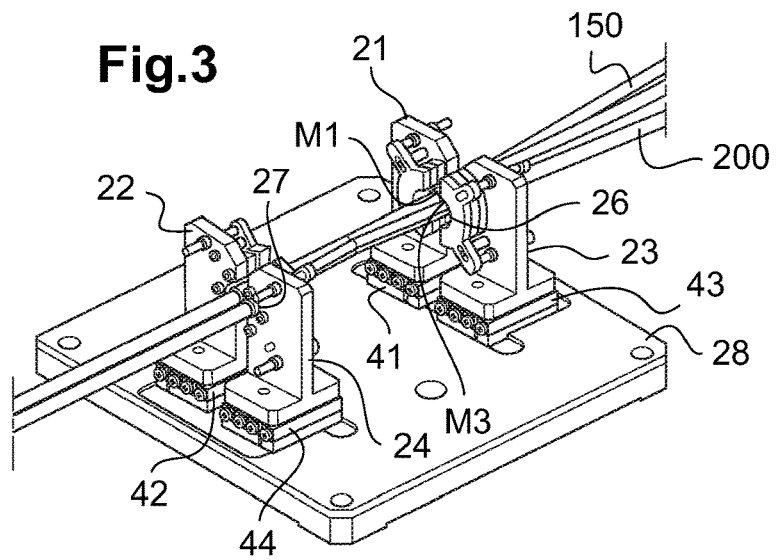
Figure 4:
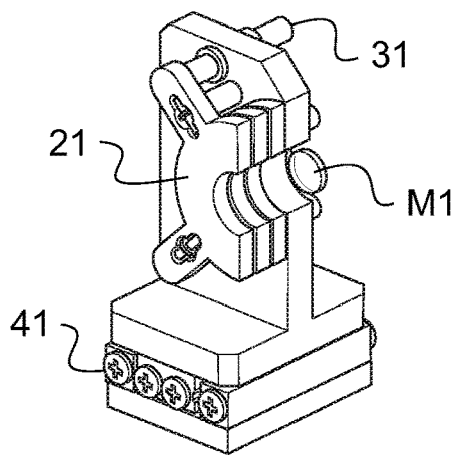
Figure 5:
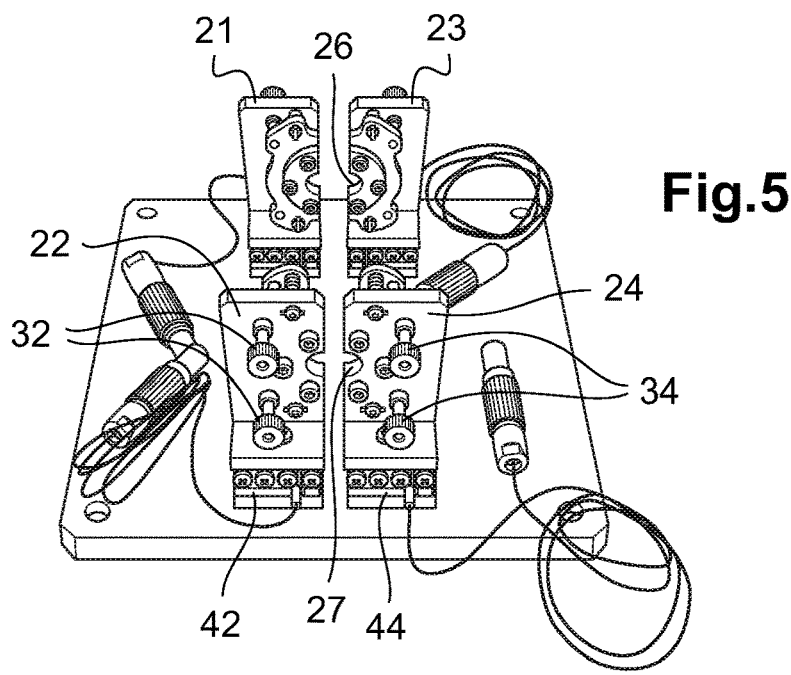
Figure 6:
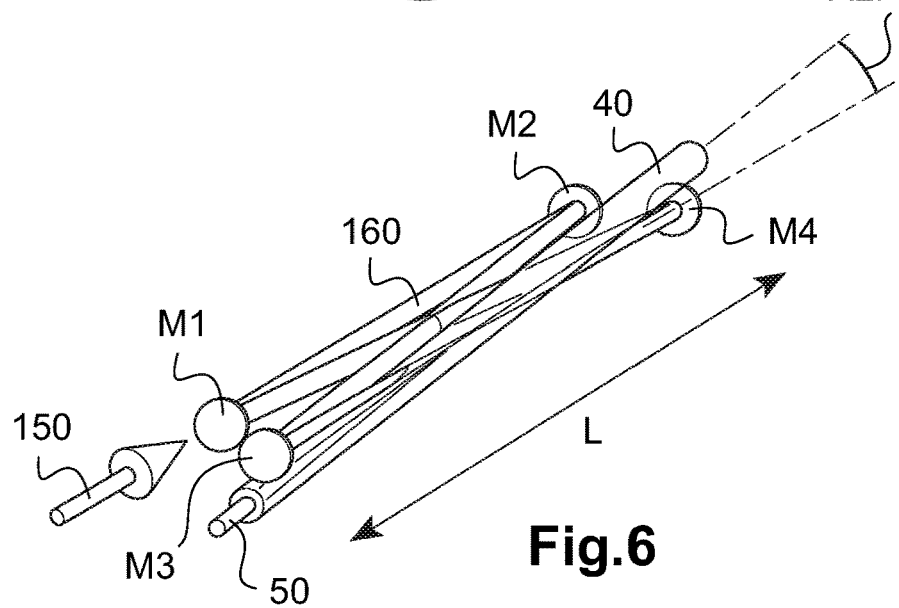
Figure 7:
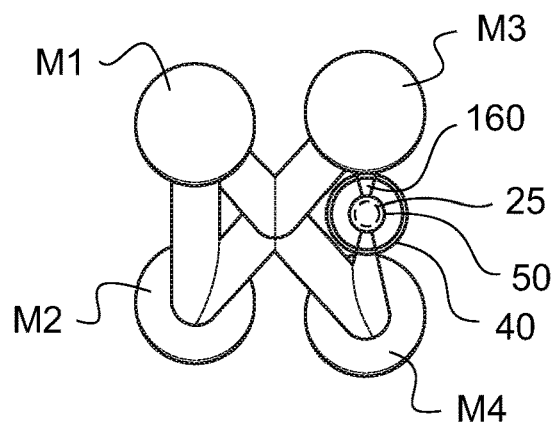
Figure 8:
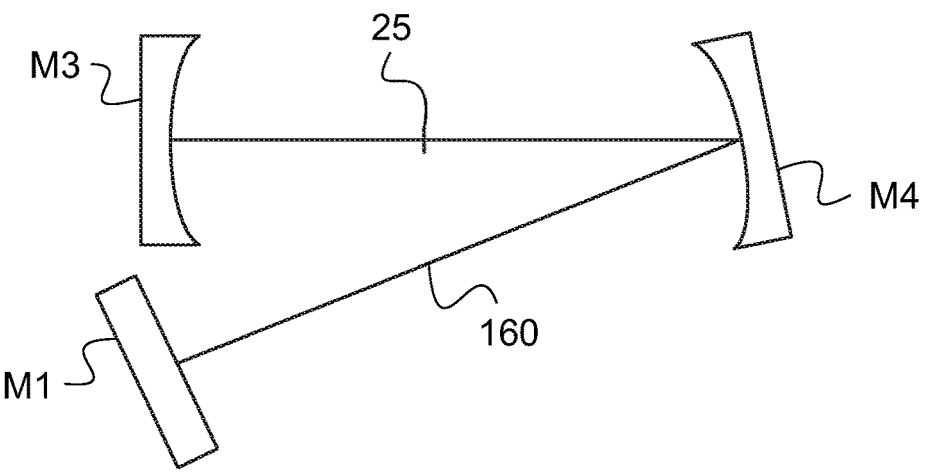
Figure 9:
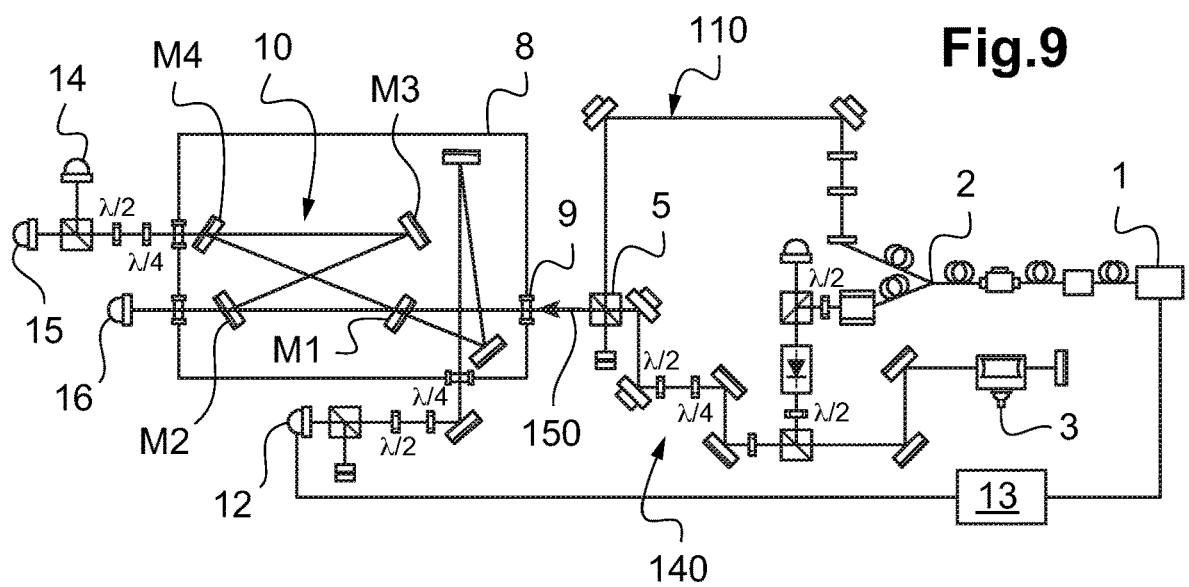

In the appended drawings:

FIG. 1 schematically shows an ultra-short giant laser pulse generation system according to the invention;

FIG. 2 schematically shows a perspective view of a vacuum chamber comprising a resonant optical cavity according to an embodiment;

FIG. 3 schematically shows a perspective view of the arrangement of the mirror frames of the resonant optical cavity of FIG. 2;

FIG. 4 shows an example of mirror frame with its micro-precision adjustments;

FIG. 5 schematically shows an exemplary embodiment of an arrangement of mirror frames forming a resonant optical cavity with 4 mirrors arranged in a coplanar configuration;

FIG. 6 schematically shows, in a perspective view, the coupling of a charged particle beam with an ultra-short and high-energy giant laser pulse focused at one point of a 4-mirror resonant optical cavity to form an inverse Compton scattering beam;

FIG. 7 schematically shows another view of the interaction between a charged particle beam with a high-energy pulse laser beam in a 4-mirror resonant optical cavity to form an inverse Compton scattering beam;

FIG. 8 shows a 3-mirror resonant optical cavity variant;

FIG. 9 schematically shows an ultra-short giant laser pulse generation system according to a variant of the invention.

DEVICE AND METHOD

In FIG. 1 is shown an ultra-short giant laser pulse generation system.

In the present document, it is meant by "ultra-short pulse" a light pulse having a duration generally comprised between 20 fs and about 10 ps, and a spectral width of 0.1 to 50 nm.

The system of FIG. 1 comprises a laser source 80, adapted to generate a burst of ultra-short and high-energy laser pulses, combined with a resonant optical cavity 10 and a feedback loop control system.

In an embodiment, the laser source 80 comprises a pulse-type oscillator 1, a beam splitter 2, a pulse picker 3, an optical amplification system 4, a beam combiner 5, reflection mirrors 6 and 7. The oscillator 1 is based on a tunable laser cavity. The oscillator 1 is adapted to generate source pulses 100 at a first repetition frequency, denoted $f_1$. Advantageously, the first repetition frequency is higher than or equal to 500 MHz, and preferably higher than or equal to 1 GHz, or even several gigahertz. As a function of the first repetition frequency $f_1$, the source pulses 100 are separated from each other by a time interval comprised between 0.3 ns and 2 ns.

The beam splitter 2 and the beam combiner 5 are for example of the polarisation splitter cube type. In this case, the source pulses 100 are polarized, for example linearly at the exit of the oscillator 1. The beam splitter 2 is arranged and directed so as to spatially split the source pulse beam 100 into a pulse beam 110 and other pulse beam 120. The pulse beam 110 is reflected on the mirrors 6, 7 and forms a low-power pulse beam 110 at the first repetition frequency $f_1$.

The pulse picker 3 is for example based on an electro-optical modulator. The pulse picker 3 receives the other pulse beam 120 coming from the oscillator 1 and selects a burst of N sources pulses, where N is a natural integer higher than 1, preferably comprised between 25 and 10000, and in still more preferably, between 100 and 300. Advantageously, the pulse picker 3 operates at a second repetition frequency, denoted $f_2$, lower than or equal to 4 MHz. As an alternative, the pulse picker 3 may also operate by selecting a single pulse burst. In a same burst of N pulses, the pulses are spaced apart by the time interval determined by the first repetition frequency $f_1$.

The optical amplification system 4 comprises one or several optical amplifiers arranged in series. The optical amplification system 4 may be based on fibre-optic, disk and/or solid amplifiers. The optical amplification system 4 receives a burst of N pulses and amplifies them to form a burst of N high-power light pulses. The optical amplification system 4 hence delivers a high-power pulse beam 120 consisted of bursts of N pulses, the bursts being generally emitted at the second repetition frequency $f_2$.

According to a variant, instead of the high-frequency pulse oscillator and one or several linear optical amplifiers, the laser source 80 comprise a regenerative amplifier, preferably of the fibre-optic type. Preferably, in this case, the regenerative amplifier comprises a regenerative optical cavity, means for injecting source pulses at a repetition period $T_1$ in said regenerative optical cavity and means for extracting said laser pulses from said regenerative optical cavity. In this case, the regenerative optical cavity exhibits a total length such that the duration of a roundtrip of each pulse in said regenerative optical cavity is comprised between N–1 and N times the period $T_1$, where N is an integer higher than or equal to two, said injection means being adapted to trap a burst of N laser pulses in said regenerative optical cavity, said extraction means being adapted to extract said burst of N laser pulses of said regenerative optical cavity and said optical amplifier medium being adapted to form a burst of amplified laser pulses. Advantageously, the injection means and the extraction means comprise a Pockels cell configured so as to be fully blocking between the injection of the burst of pulses and the extraction of said burst of pulses. Preferably, the regenerative optical cavity is a multi-pass cavity and the amplifier medium is arranged in said multi-pass regenerative optical cavity so that a pulse of the burst of pulses performs a plurality of passages through the amplifier medium. Advantageously, the regenerative optical cavity is a multi-pass cavity comprising an optical system with mirrors arranged so that the incident beam on each of said mirrors is spatially offset at each passage in said multi-pass cavity and the amplifier medium is arranged inside the regenerative optical cavity.

A laser source is hence available, which generates a burst of N ultra-short and high-power laser pulses, the pulses of a same burst being at the first repetition frequency, $f_1$, higher than or equal to 0.5 gigahertz (GHz), and preferably higher than or equal to 1 GHz.

Hereinafter, the following terms are used as equivalents: burst of pulses, train of pulses, series of pulses or macro-pulse (multi-bunch).

The beam combiner 5 is arranged and directed so as to spatially recombine the low-power pulse beam 110 at the first repetition frequency $f_1$ and the high-power pulse beam 120 consisted of bursts of N pulses into a light pulse beam 150.

This light pulse beam 150 is injected through an opening 9 into the vacuum chamber 8 comprising the resonant optical cavity.

FIGS. 2 to 7 illustrate in details a four-mirror resonant optical cavity according to a first embodiment of the invention.

The resonant optical cavity 10 comprises two planar mirrors M1, M2 and two spherical mirrors M3, M4. The mirrors M1, M2, M3, M4 are arranged in a planar configuration, at the ends of an elongated quadrilateral. The mirrors M3 and M4 are arranged in a concentric configuration and have preferably the same radius of curvature, R/2, the distance between the mirrors M3 and M4 being equal to R. The pulse beam 150 is injected into the resonant optical cavity through the planar mirror M1 and goes towards the planar mirror M2 that reflects it towards the spherical mirror M3. The mirror M3 reflects the pulse beam 150 towards the mirror M4 while focusing this beam to an interaction area 25 located on the optical axis between the mirror M3 and the mirror M4. The mirror reflects the pulse beam 150 towards the mirror M1, hence forming a closed-loop optical path. The resonant optical cavity 10 hence allows propagating the pulse beam 150 following an X-shape folded loop (see FIG. 7-8). The total length of a roundtrip in the resonant optical cavity is adjusted so that the N pulses of a same burst are coherently superimposed to each other by constructive interferences to form a giant pulse in the resonant optical cavity. Moreover, the resonant optical cavity 10 focuses the giant pulse to an interaction area 25, for example to a focal plane 20 located between the mirrors M3 and M4. The giant pulse circulates N times in the cavity, at the GHz rate. The resonant optical cavity 10 is filled and emptied at the rate of the pulse burst, i.e. at the second repetition frequency $f_2$.

The giant pulse has the same duration as the laser pulses of the laser source.

For a burst of N≈2000 pulses having a duration of ~200 fs, and an energy per source pulse of the order of 20-30 mJ, a pulse having an intensity of the order of $10^{15}$ W/cm$^2$ is obtained in the interaction area 25. The transverse size at the waist of the laser beam is of the order of 30 microns. Hence, the energy of the pulses of a burst is stored at the interaction point. Moreover, the giant pulse may be repeated at the second repetition frequency in the same interaction area 25. It is hence possible to interact several times with a giant laser pulse.

The length of the optical path during a roundtrip in the resonant optical cavity 10 is determined as a function of the first repetition frequency $f_1$. More precisely, this roundtrip length is equal to $c/f_1$, where c is the speed of light in the resonant optical cavity. For example, for a first repetition frequency $f_1$ of ~1 GHz, a roundtrip length of ~30 cm in the resonant optical cavity is chosen. The physical length L of the resonant optical cavity is in this case of the order of ~15 cm and the mirrors M3 and M4 have a radius of curvature of about 8 cm. The physical length L of the resonant optical cavity is herein four time lower than a two-mirror resonant optical cavity having the same roundtrip length. In another example, for an oscillator operating at a first repetition frequency $f_1$ of 3 GHz, a roundtrip length of ~10 cm in the resonant optical cavity is chosen, with mirrors M3, M4 having a radius of curvature of the order of 2.5 cm. The diameter of the mirrors M1, M2, M3, M4 is comprised between 1 mm and a few centimetres, for example of the order of 6 mm (or ¼ of inch). However, this configuration poses technical difficulties of optical alignment of the resonant optical cavity with the constraint of maintaining the efficiency of this resonant optical cavity. This configuration requires miniaturized and very high-precision optomechanical adjustments to obtain the desired interferometric adjustment. A very compact resonant optical cavity is hence obtained. The resonant optical cavity is folded, which allows reducing the bulk of the resonant optical cavity about the interaction area. The resonant optical cavity is handy. This compactness allows placing the resonant optical cavity in a low-volume vacuum chamber, which significantly simplifies the implementation of this system. The compactness of the vacuum chamber and of the resonant optical cavity allows a better isolation with respect to the surrounding vibrations and a cost reduction of the whole system. Moreover, the small bulk of the resonant optical cavity, even if placed in a vacuum chamber, allows more easily inserting this system into a charged particle beam line, whose environment is generally very cluttered by various scientific instruments. This configuration allows making more easily an interaction between a very high-intensity laser pulse and a charged particle beam in a determined interaction area.

FIG. 3 illustrates the mounting of the supports of the mirrors M1, M2, M3 and M4 on a same platform 28. More precisely, the mirror M1 is mounted on a support 21, and respectively, the mirror M2 on a support 22, the mirror M3 on a support 23 and the mirror M4 on a support 24. The support 21 is arranged on a translation plate 41. Similarly, the support 22, respectively 23, 24, is arranged on a translation plate 42, respectively 43, 44.

FIG. 4 illustrates in more detail the mounting of the mirror M1 on the support 21, provided with micrometre adjustments 31.

More precisely, the laser oscillator 1 operating in pulse mode is controlled in frequency on the resonant optical cavity 10 in order to store the energy of the laser pulses of a burst by constructive interferences.

In the variant in which a regenerative amplifier is used to generate the burst of pulses, the length of the regenerative optical cavity, which determines the first repetition frequency, is controlled on the resonant optical cavity 10 in order to store the energy of the laser pulses of a burst by constructive interferences.

The mirror M1 is configured so as to let through a part 200 of the low-power pulse beam injected simultaneously with the burst of pulses into the resonant optical cavity 10. A detector 12 detects the part 200 of the low-power pulse beam extracted from the resonant optical cavity. The part 200 of the low-power pulse beam is also at the first repetition frequency $f_1$.

A servo control system 13 deduces therefrom an error signal and applies this error signal so as to control the cavity of the laser oscillator 1 or, respectively, the regenerative optical cavity of the regenerative amplifier. Hence, the first repetition frequency $f_1$ is controlled as a function of the length of the resonant optical cavity so as to maximise the energy and/or the power of the giant pulse in an interaction area 25 of the resonant optical cavity. This control loop operates at a frequency of the order of 1 MHz. Hence, the frequency of the laser source is controlled as a function of the slow drifts of the length of the resonant optical cavity 10.

FIG. 5 illustrates the optomechanical mounting of the four-mirror resonant optical cavity. Particularly advantageously, the resonant optical cavity 10 comprises a first opening 26 on the frame 23 under the spherical mirror M3. Likewise, the resonant optical cavity 10 comprises a second opening 27 on the frame 24 above the mirror M4.

The resonant optical cavity may be implemented on a particle accelerator.

In an application to the interaction between an electron beam and a laser beam, illustrated in FIGS. 6 and 7, an electron beam 40 is injected into the resonant optical cavity 10. More precisely, the electron beam 40 is directed so as to pass through the first opening 26 and/or the second opening 27 towards the focal area of the resonant optical cavity 10. Hence, the electron beam 40 may interact with the giant pulse formed in the interaction area 25 of the resonant optical cavity 10. This interaction generates an inverse Compton scattering beam 50 which may be detected.

The diameter of the spherical mirrors M3, M4 determines the minimum crossing angle between the charged particle beam 40 and the laser beam 160.

The distance between the mirrors may be adjusted as a function of the distance between packets of charged particles, by means of the translation plates 41, 42, 43 and/or 44. The overlapping of the giant laser pulse and the charged particles beam is better if the crossing angle ALPHA is low and the transverse size of the laser beam is small with respect to the transverse size of the charged particle beam. A crossing angle ALPHA lower than or equal to 3 or 4 degrees is obtained for a cavity having a roundtrip length of ~30 cm.

This system is particularly advantageous in the case where packets of charged particles are emitted with an inter-packet period of the order of 1 ns, i.e. a frequency of the order of the gigahertz. Indeed, the first repetition frequency $f_1$ of the oscillator may be synchronized via a second servo control system on the frequency of generation of the packets of charged particles.

FIG. 8 illustrates a resonant optical cavity according to a three-mirror variant. In this variant, the resonant optical cavity 10 comprises a planar mirror M1, for injection, and two spherical mirrors M3, M4. The three mirrors M1, M3, M4 are arranged in a planar configuration. Advantageously, the two spherical mirrors M3, M4 are arranged in a concentric configuration. For example, the spherical mirrors M3, M4 have the same radius of curvature, R/2, and the distance between the mirrors M3 and M4 is equal to R. Hence, the interaction area to which the giant laser pulse is focused is located at half the distance between the mirror M3 and the mirror M4. The physical length L of the three-mirror resonant optical cavity is herein three times lower than a two-mirror resonant optical cavity having the same roundtrip length.

FIG. 9 illustrates a variant of an ultra-short and high-energy giant laser pulse generation system, further comprising other detectors 14, 15, 16 arranged so as to detect other leakage signals coming from the mirrors M2 and M4.

In another application, the laser source controlled on the resonant optical cavity may be used to generate an interaction between a laser beam and a sample, and to measure an inelastic scattering, for example of the Raman scattering type.

For that purpose, a sample to be analysed is placed in the interaction area 25 of a resonant optical cavity of a system as described hereinabove and a light beam formed by scattering of the giant laser pulse on the sample is collected. A filter separates the light beam scattered into a light beam representative of the elastic scattering component, or Rayleigh scattering, and a light beam representative of the inelastic scattering component, for example Raman scattering. A spectrometer spectrally analyses the inelastic scattering light beam. This system allows increasing the intensity of the inelastic scattering light beam due to the extremely high intensity of the giant laser pulse incident on the sample.

The invention claimed is:

1. A system for generating a spatially localised high-intensity laser beam, wherein said system comprises:
   a laser source (80) adapted to generate a burst of N laser pulses, where N is a natural integer higher than 1, the N laser pulses having a first repetition frequency ($f_1$), the laser pulses being ultra-short laser pulses having a duration lower than or equal to 1 picosecond and the first repetition frequency ($f_1$) being higher than or equal to 0.5 gigahertz, a resonant optical cavity (10) adapted to receive and store said burst of N laser pulses, the resonant optical cavity (10) being adapted to focus the burst of N laser pulses to an interaction area (25) of the resonant optical cavity (10), a round-trip distance in the resonant optical cavity being equal to $c/f_1$, where c is the speed of light, and a servo control system (13) adapted to control the first repetition frequency ($f_1$) with respect to the round-trip distance in the resonant optical cavity so that the N pulses of the burst are temporally and spatially superimposed to each other by constructive interferences in the interaction area (25) to form an ultra-short and high-energy giant pulse.

2. The system according to claim 1, wherein the laser source comprises an oscillator (1) emitting at the first repetition frequency ($f_1$) higher than or equal to 1 GHz.

3. The system according to claim 1, wherein the laser source (80) comprises a regenerative amplifier comprising a primary optical cavity, and wherein the servo control system (13) is adapted to adjust the length of the primary optical cavity so as to control the first repetition frequency ($f_1$).

4. The system according to claim 1, wherein the laser source (80) comprises a pulse picker (3) adapted to select the burst of N ultra-short laser pulses with a second repetition frequency ($f_2$) lower than or equal to 4 MHz.

5. The system according to claim 1, wherein the resonant optical cavity comprises mirrors (M1, M2, M3, M4) arranged in a planar configuration.

6. The system according to claim 1, wherein the resonant optical cavity (10) is arranged in a vacuum chamber (8) comprising at least one opening (9) adapted to receive the burst of N ultra-short laser pulses, said at least one opening (9) being adapted to receive a charged particle beam (40), the resonant optical cavity (10) being arranged so that the charged particle beam (40) propagates in the interaction area (25) under an incidence angle lower than or equal to 5 degrees with respect to a direction of propagation of the burst of laser pulses in the interaction area (25).

7. A Raman spectrometry device comprising a system according to claim 1, wherein the interaction area (25) is intended to receive a sample to be analysed, the Raman spectrometry device comprising a Raman spectrometer arranged so as to measure a Raman scattering optical beam formed by scattering of said ultra-short giant pulse on the sample of the interaction area (25).

8. A method for generating a spatially localised high-intensity laser beam, comprising the following steps:
generating laser pulses having a duration lower than or equal to 1 picosecond at a first repetition frequency ($f_1$), the first repetition frequency being higher than or equal to 0.5 gigahertz;
selecting a burst of N laser pulses at the first repetition frequency ($f_1$), where N is a natural integer higher than or equal to 1;
injecting the burst of N laser pulses into a resonant optical cavity (10), the resonant optical cavity (10) having a roundtrip distance equal to $c/f_1$, where c is the speed of light in the resonant optical cavity, the resonant optical cavity (10) being adapted to focus the burst of N laser pulses to an interaction area (25) of the resonant optical cavity (10); and
controlling the first repetition frequency ($f_1$) with respect to the roundtrip distance of the resonant optical cavity (10) so that the N pulses of the burst are temporally and spatially superimposed to each other by constructive interferences in the interaction area (25) to form an ultra-short and high-energy giant pulse.

9. A method for measuring inelastic scattering by interaction of the ultra-short giant pulse generated according to the method of claim 8 with a charged particle beam propagating in the interaction area (25) of the resonant optical cavity (10) in synchronism with the ultra-short giant pulse.

10. A method for measuring inelastic scattering by interaction of the ultra-short giant pulse generated according to the method of claim 8 with a sample placed in the interaction area (25) of the resonant optical cavity (10).

11. The system according to claim 2, wherein the laser source (80) comprises a pulse picker (3) adapted to select the burst of N ultra-short laser pulses with a second repetition frequency ($f_2$) lower than or equal to 4 MHz.

12. The system according to claim 3, wherein the laser source (80) comprises a pulse picker (3) adapted to select the burst of N ultra-short laser pulses with a second repetition frequency ($f_2$) lower than or equal to 4 MHz.

13. The system according to claim 2, wherein the resonant optical cavity comprises mirrors (M1, M2, M3, M4) arranged in a planar configuration.

14. The system according to claim 3, wherein the resonant optical cavity comprises mirrors (M1, M2, M3, M4) arranged in a planar configuration.

15. The system according to claim 4, wherein the resonant optical cavity comprises mirrors (M1, M2, M3, M4) arranged in a planar configuration.

16. The system according to claim 2, wherein the resonant optical cavity (10) is arranged in a vacuum chamber (8) comprising at least one opening (9) adapted to receive the burst of N ultra-short laser pulses, said at least one opening (9) being adapted to receive a charged particle beam (40), the resonant optical cavity (10) being arranged so that the charged particle beam (40) propagates in the interaction area (25) under an incidence angle lower than or equal to 5 degrees with respect to a direction of propagation of the burst of laser pulses in the interaction area (25).

17. The system according to claim 3, wherein the resonant optical cavity (10) is arranged in a vacuum chamber (8) comprising at least one opening (9) adapted to receive the burst of N ultra-short laser pulses, said at least one opening (9) being adapted to receive a charged particle beam (40), the resonant optical cavity (10) being arranged so that the charged particle beam (40) propagates in the interaction area (25) under an incidence angle lower than or equal to 5 degrees with respect to a direction of propagation of the burst of laser pulses in the interaction area (25).

18. The system according to claim 4, wherein the resonant optical cavity (10) is arranged in a vacuum chamber (8) comprising at least one opening (9) adapted to receive the burst of N ultra-short laser pulses, said at least one opening (9) being adapted to receive a charged particle beam (40), the resonant optical cavity (10) being arranged so that the charged particle beam (40) propagates in the interaction area (25) under an incidence angle lower than or equal to 5 degrees with respect to a direction of propagation of the burst of laser pulses in the interaction area (25).

19. The system according to claim 5, wherein the resonant optical cavity (10) is arranged in a vacuum chamber (8) comprising at least one opening (9) adapted to receive the burst of N ultra-short laser pulses, said at least one opening (9) being adapted to receive a charged particle beam (40), the resonant optical cavity (10) being arranged so that the charged particle beam (40) propagates in the interaction area (25) under an incidence angle lower than or equal to 5 degrees with respect to a direction of propagation of the burst of laser pulses in the interaction area (25).

20. A Raman spectrometry device comprising a system according to claim 2, wherein the interaction area (25) is intended to receive a sample to be analysed, the Raman spectrometry device comprising a Raman spectrometer arranged so as to measure a Raman scattering optical beam formed by scattering of said ultra-short giant pulse on the sample of the interaction area (25).

* * * * *